United States Patent
Liu (10) Patent No.: US 11,922,323 B2
(45) Date of Patent: Mar. 5, 2024

(54) META-REINFORCEMENT LEARNING GRADIENT ESTIMATION WITH VARIANCE REDUCTION

(71) Applicant: Salesforce, Inc., San Francisco, CA (US)

(72) Inventor: Hao Liu, Palo Alto, CA (US)

(73) Assignee: Salesforce, Inc., San Francisco, CA (US)

( * ) Notice: Subject to any disclaimer, the term of this patent is extended or adjusted under 35 U.S.C. 154(b) by 1013 days.

(21) Appl. No.: 16/395,083

(22) Filed: Apr. 25, 2019

(65) Prior Publication Data

US 2020/0234113 A1 Jul. 23, 2020

Related U.S. Application Data

(60) Provisional application No. 62/796,000, filed on Jan. 23, 2019, provisional application No. 62/793,524, filed on Jan. 17, 2019.

(51) Int. Cl.
*G06N 3/088* (2023.01)
*G06N 3/08* (2023.01)

(52) U.S. Cl.
CPC ............. *G06N 3/088* (2013.01); *G06N 3/08* (2013.01)

(58) Field of Classification Search
CPC ........... G06N 3/088; G06N 3/08; G06N 7/005
See application file for complete search history.

(56) References Cited

U.S. PATENT DOCUMENTS

| | | | |
|---|---|---|---|
| 10,282,663 B2 | 5/2019 | Socher et al. | |
| 10,346,721 B2 | 7/2019 | Albright et al. | |
| 2010/0063948 A1* | 3/2010 | Virkar | G06N 20/10 707/769 |
| 2016/0350653 A1 | 12/2016 | Socher et al. | |
| 2017/0024645 A1 | 1/2017 | Socher et al. | |
| 2017/0032280 A1 | 2/2017 | Socher | |
| 2017/0140240 A1 | 5/2017 | Socher | |
| 2018/0082171 A1 | 3/2018 | Merity et al. | |
| 2018/0096219 A1 | 4/2018 | Socher | |
| 2018/0121787 A1 | 5/2018 | Hashimoto et al. | |
| 2018/0121788 A1 | 5/2018 | Hashimoto et al. | |
| 2018/0121799 A1 | 5/2018 | Hashimoto et al. | |
| 2018/0129931 A1 | 5/2018 | Bradbury et al. | |
| 2018/0129937 A1 | 5/2018 | Bradbury et al. | |
| 2018/0129938 A1 | 5/2018 | Xiong et al. | |
| 2018/0143966 A1 | 5/2018 | Lu et al. | |

(Continued)

OTHER PUBLICATIONS

Al-Shedivat et al ("Continuous Adaptation via Meta-Learning in Nonstationary and Competitive Environments", International Conference on Learning Representations Feb. 23, 2018, pp. 1-21) (Year: 2018).*

(Continued)

*Primary Examiner* — Michael N Opsasnick
(74) *Attorney, Agent, or Firm* — Haynes and Boone LLP (57) ABSTRACT

A method for deep reinforcement learning using a neural network model includes receiving a distribution including a plurality of related tasks. Parameters for the reinforcement learning neural network model is trained based on gradient estimation associated with the parameters using samples associated with the plurality of related tasks. Control variates are incorporated into the gradient estimation by automatic differentiation.

20 Claims, 8 Drawing Sheets

(56) References Cited

U.S. PATENT DOCUMENTS

| | | | |
|---|---|---|---|
| 2018/0144208 A1 | 5/2018 | Lu et al. | |
| 2018/0144248 A1 | 5/2018 | Lu et al. | |
| 2018/0165603 A1* | 6/2018 | Van Seijen | G06N 3/045 |
| 2018/0268287 A1 | 9/2018 | Johansen et al. | |
| 2018/0268298 A1 | 9/2018 | Johansen et al. | |
| 2018/0300317 A1 | 10/2018 | Bradbury | |
| 2018/0300400 A1 | 10/2018 | Paulus | |
| 2018/0336198 A1 | 11/2018 | Zhong et al. | |
| 2018/0336453 A1 | 11/2018 | Merity et al. | |
| 2018/0349359 A1 | 12/2018 | McCann et al. | |
| 2018/0373682 A1 | 12/2018 | McCann et al. | |
| 2018/0373987 A1 | 12/2018 | Zhang et al. | |
| 2019/0095818 A1* | 3/2019 | Varadarajan | G06N 20/00 |
| 2019/0130206 A1 | 5/2019 | Trott et al. | |
| 2019/0130248 A1 | 5/2019 | Zhong et al. | |
| 2019/0130249 A1 | 5/2019 | Bradbury et al. | |
| 2019/0130273 A1 | 5/2019 | Keskar et al. | |
| 2019/0130292 A1* | 5/2019 | N | G06N 5/047 |
| 2019/0130312 A1* | 5/2019 | Xiong | G06N 3/045 |
| 2019/0130896 A1 | 5/2019 | Zhou et al. | |
| 2019/0130897 A1 | 5/2019 | Zhou et al. | |
| 2019/0149834 A1 | 5/2019 | Zhou et al. | |
| 2019/0188568 A1 | 6/2019 | Keskar et al. | |
| 2019/0213482 A1 | 7/2019 | Socher et al. | |
| 2019/0236482 A1* | 8/2019 | Desjardins | G06N 3/00 |
| 2019/0251168 A1 | 8/2019 | McCann et al. | |
| 2019/0251431 A1 | 8/2019 | Keskar et al. | |
| 2019/0258714 A1 | 8/2019 | Zhong et al. | |
| 2019/0258939 A1 | 8/2019 | Min et al. | |
| 2019/0286073 A1 | 9/2019 | Asl et al. | |
| 2019/0295530 A1 | 9/2019 | Asl et al. | |
| 2020/0035016 A1* | 1/2020 | Muller | G06N 3/10 |
| 2020/0074296 A1* | 3/2020 | Singh | G06N 3/044 |
| 2020/0142888 A1* | 5/2020 | Alakuijala | G06N 3/08 |
| 2020/0279155 A1* | 9/2020 | Liu | G06N 3/08 |

OTHER PUBLICATIONS

Al-Shedivat et al., "Continuous Adaptation via Meta-Learning in Nonstationary and Competitive Environments," International Conference of Learning Representations (ICLR) 2018, pp. 1-21.
Andrychowicz et al., "Learning Dexterous In-Hand Manipulation," Machine Learning, 2018, pp. 1-27.
Arjona-Medina et al., "RUDDER: Return Decomposition for Delayed Rewards," Machine Learning, 2018, pp. 1-102.
Brockman et al., "OpenAI Gym," Machine Learning, 2016a, pp. 1-4.
Castronovo et al., "Approximate Bayes Optimal Policy Search using Neural Networks," In Proceedings of the 9th International Conference on Agents and Artificial Intelligence, 2017, pp. 142-153.
Clavera et al., "Model-Based Reinforcement Learning via Meta-Policy Optimization," 2nd Conference on Robot Learning (CoRL 2018), Zurich, Switzerland, 2018, pp. 1-13.
Duan et al., "RL 2 : Fast Reinforcement Learning via Slow Reinforcement Learning," International Conference on Learning Representations (ICLR), 2016, pp. 1-14.
Finn et al., "Model-Agnostic Meta-Learning for Fast Adaptation of Deep Networks," Proceedings of the 34th International Conference on Machine Learning, 2017, pp. 1126-1135.
Foerster et al., "DiCE: The Infinitely Differentiable Monte Carlo Estimator," Proceedings of the 35th International Conference on Machine Learning, 2018, pp. 1-10.
Furmston et al., "Approximate Newton Methods for Policy Search in Markov Decision Processes," The Journal of Machine Learning Research, 2016, pp. 8055-8105.
Glasserman, "Monte Carlo Methods in Financial Engineering," Springer Science & Business Media, 2013, pp. 1-6.
Grathwohl et al., "Backpropagation Through the Void: Optimizing Control Variates for Black-box Gradient Estimation," International Conference on Learning Representations (ICLR), 2017, pp. 1-17.
Greensmith et al., "Variance Reduction Techniques for Gradient Estimates in Reinforcement Learning," Journal of Machine Learning Research, 2004, pp. 1471-1530.
Heess et al., "Emergence of Locomotion Behaviours in Rich Environments," 2017, pp. 1-14.
Heess et al., "Learning Continuous Control Policies by Stochastic Value Gradients," In Advances in Neural Information Processing Systems, 2015, pp. 2944-2952.
Hochreiter et al., "Learning to Learn Using Gradient Descent," In International Conference on Artificial Neural Networks, Springer, 2001, pp. 87-94.
Houthooft et al., "Evolved Policy Gradients," 32nd Conference on Neural Information Processing Systems, 2018, pp. 5405-5414.
Jurgen Schmidhuber, "Evolutionary Principles in Self-Referential Learning, or on Learning How to Learn: the Meta-meta . . . Hook", PhD thesis, Technische Universitat Mtinchen, 1987.
Kakade, "A Natural Policy Gradient", In Advances in Neural Information Processing Systems, 2002, pp. 1531-1538.
Kalashnikov et al., "QT-Opt: Scalable Deep Reinforcement Learning for Vision-Based Robotic Manipulation," 2nd Conference on Robot Learning, 2018, pp. 1-23.
Kingma et al., "Adam: A Method for Stochastic Optimization," International Conference on Learning Representations (ICLR), 2014, pp. 1-15.
Levine et al., "Learning Hand-Eye Coordination for Robotic Grasping With Deep Learning and Large-Scale Data Collection," The International Journal of Robotics Research, 2018, pp. 421-436.
Li et al., "Deep Reinforcement Learning for Dialogue Generation," CoRR, abs/1606.01541, 2016, pp. 1-11.
Liu et al., "Action-Dependent Control Variates for Policy Optimization via Stein Identity," International Conference of Learning Representations (ICLR), 2018, pp. 1-16.
Mao et al., "Variance Reduction for Reinforcement Learning in Input-Driven Environments," International Conference on Learning Representations (ICLR), 2018, pp. 1-20.
Mishra et al., "A Simple Neural Attentive Meta-Learner," International Conference on Learning Representations (ICLR), 2018, pp. 1-17.
Mnih et al., "Asynchronous Methods for Deep Reinforcement Learning," In International Conference on Machine Learning, 2016, pp. 1928-1937.
Mnih et al., "Human-Level Control Through Deep Reinforcement Learning," Nature, 2015, pp. 529-533.
OpenAI Five, (available at https://blog.openai.com/openai-five/), 2018.
Paszke et al., "Automatic Differentiation in Pytorch," Neural Information Processing Systems (NIPS)-Workshop, 2017, pp. 1-4.
Philip Thomas, "Bias in Natural Actor-Critic Algorithms," In International Conference on Machine Learning, 2014, pp. 441-448.
Rothfuss et al., "Promp: Proximal Meta-Policy Search", International Conference on Learning Representations (ICLR), 2018, pp. 1-25.
Schaul et al., "Universal Value Function Approximators", In International Conference on Machine Learning, 2015, pp. 1312-1320.
Schulman et al., "Gradient Estimation Using Stochastic Computation Graphs," In Advances in Neural Information Processing Systems, 2015a, pp. 3528-3536.
Schulman et al., "High-Dimensional Continuous Control Using Generalized Advantage Estimation," International Conference of Learning Representations (ICLR), 2015c.
Schulman et al., "Proximal Policy Optimization Algorithms," Advances in Neural Information Processing Systems, 2017.
Schulman et al., "Trust Region Policy Optimization," In International Conference on Machine Learning, 2015b.
Silver et al., "Mastering the Game of Go With Deep Neural Networks and Tree Search," Nature, 2016, pp. 484-489.
Silver et al., "Mastering the Game of Go Without Human Knowledge," Nature, 2017, pp. 354-359.
Smith et al., "A Developmental Approach to Machine Learning?," Frontiers in Psychology, 2017.
Stadie et al., "Some Considerations on Learning to Explore via Meta-Reinforcement Learning," Conference on Neural Information Processing Systems (NeurIPS), 2018, pp. 1-11.

(56) References Cited

OTHER PUBLICATIONS

Sutton et al., "Reinforcement Learning: An introduction," MIT press, 1998.
Thrun et al., "Learning to Learn," Springer Science & Business Media, 2012.
Todorov et al., "A Physics Engine for Model-Based Control," In Intelligent Robots and Systems (IROS), 2012 IEEE/RSJ International Conference on, IEEE, 2012, pp. 5026-5033.
Tucker et al., "Rebar: Low-Variance, Unbiased Gradient Estimates for Discrete Latent Variable Models," In Advances in Neural Information Processing Systems, 2017, pp. 2627-2636.
Vinyals et al., "Matching Networks for One Shot Learning," In Advances in Neural Information Processing Systems, 2016, pp. 3630-3638.
Wang et al., "Learning to Reinforcement Learn," arXiv:1611.05763, 2016, pp. 1-17.
Weber et al., "Credit Assignment Techniques in Stochastic Computation Graphs," arXiv:1901.01761, 2019, pp. 1-40.
Williams et al., "Simple Statistical Gradient-Following Algorithms for Connectionist Reinforcement Learning," Machine learning, 1992, pp. 229-256.
Wu et al., "Variance Reduction for Policy Gradient with Action-Dependent Factorized Baselines", International Conference of Learning Representations (ICLR), 2018, pp. 1-16.
Xu et al., "Meta-Gradient Reinforcement Learning", Neural Information Processing Systems (NeurIPS), 2018, pp. 1-12.

* cited by examiner

Provide one or more separate control variates for each task

320

For each task, learn the optimal action-dependent control variate(s)

Algorithm 1 Learning Meta Control Variates
---
Require: Step size $\alpha'$, $\beta'$; meta control variates parameters $\theta_V$; episodes $\mathcal{D} = \{\tau_{1:N}\}$.

1: while not done do
2:      Adapt $\theta_V$ with the first half of episodes $\{\tau_{1:N/2}\}$: $\theta_V^1 = \theta_V - \alpha' \nabla_{\theta_V} \mathcal{L}_{\tau_{1:N/2}}[V_{\theta_V}]$
3:      Estimate meta control variates $V_{\theta_V^1}(s_t)$ for $s_t \sim \tau_{N/2:N}$ using adapted $\theta_V^1$ with Equation 15
4:      Adapt $\theta_V$ with the second half of episodes $\{\tau_{N/2:N}\}$: $\theta_V^2 = \theta_V - \alpha \nabla_{\theta_V} \mathcal{L}_{\tau_{N/2:N}}[V_{\theta_V}]$
5:      Estimate meta control variates $V_{\theta_V^2}(s_t)$ for $s_t \sim \tau_{1:N/2}$ using adapted $\theta_V^2$ with Equation 15
6:      Update meta control variates: $\theta_V \leftarrow \theta_V - \beta' \nabla_{\theta_V} \mathcal{L}_{\tau_{N/2:N}}[V_{\theta_V^1}] - \beta' \nabla_{\theta_V} \mathcal{L}_{\tau_{1:N/2}}[V_{\theta_V^2}]$
7: end while

Algorithm 2 Meta RL with TMAML Gradient Estimators

Require: Task distribution $\rho$, step sizes $\alpha, \beta$.
1: Randomly initialize $\theta$
2: repeat
3:   Sample batch of tasks $T_i \sim \rho(T)$
4:   // Fitting control variates
5:   Learn meta control variates with Algorithm 1 or learn per task control variates for each $T_i$ with Equation (14).
6:   Set $\theta_o \leftarrow \theta$
7:   for all $T_i \sim \rho(T)$ do
8:     // Inner gradient update $\theta$
9:     Sample pre-update episodes $D_i = \{\tau_i\}$ from $T_i$ using $\pi_\theta$
10:    Compute adapted parameters $\theta'_{o,i} \leftarrow \theta + \alpha \nabla_\theta (J_{T_i}^{\text{TMAML}}(\theta) + J_{T_i}^{\text{DICE}}(\theta))$ with $D_i = \{\tau_i\}$
11:    Sample post-update episodes $D'_i = \{\tau'_i\}$ from $T_i$ using $\pi_{\theta'_{o,i}}$
12:    // Outer gradient update $\theta$
13:    Update $\theta \leftarrow \theta + \beta \sum_{T_i} \nabla_\theta (J_{T_i}^{\text{TMAML}}(\theta) + J_{T_i}^{\text{DICE}}(\theta))$ using $D'_i = \{\tau'_i\}$
14:  end for
15: until $\theta$ converge

META-REINFORCEMENT LEARNING GRADIENT ESTIMATION WITH VARIANCE REDUCTION

RELATED APPLICATIONS

This application claims priority to U.S. Provisional Patent Application No. 62/793,524, filed Jan. 17, 2019 and U.S. Provisional Patent Application No. 62/796,000, filed Jan. 23, 2019. Each of the above-referenced applications is incorporated by reference herein in its entirety.

TECHNICAL FIELD

The present disclosure relates generally to neural networks and more specifically to using neural networks for performing tasks including image classification and natural language processing.

BACKGROUND

Neural network models with deep reinforcement learning may be used in various domains including for example, playing games, dialogue systems, robotics, image classification, and natural language processing. However, those neural network models suffer from high sample complexity in learning even a single task, and often fail to adapt to new situations.

Accordingly, it would be advantageous to develop systems and methods for using neural network models to more efficiently learn new tasks.

BRIEF DESCRIPTION OF THE DRAWINGS

In the figures, elements having the same designations have the same or similar functions.

DETAILED DESCRIPTION

Figure 1A:
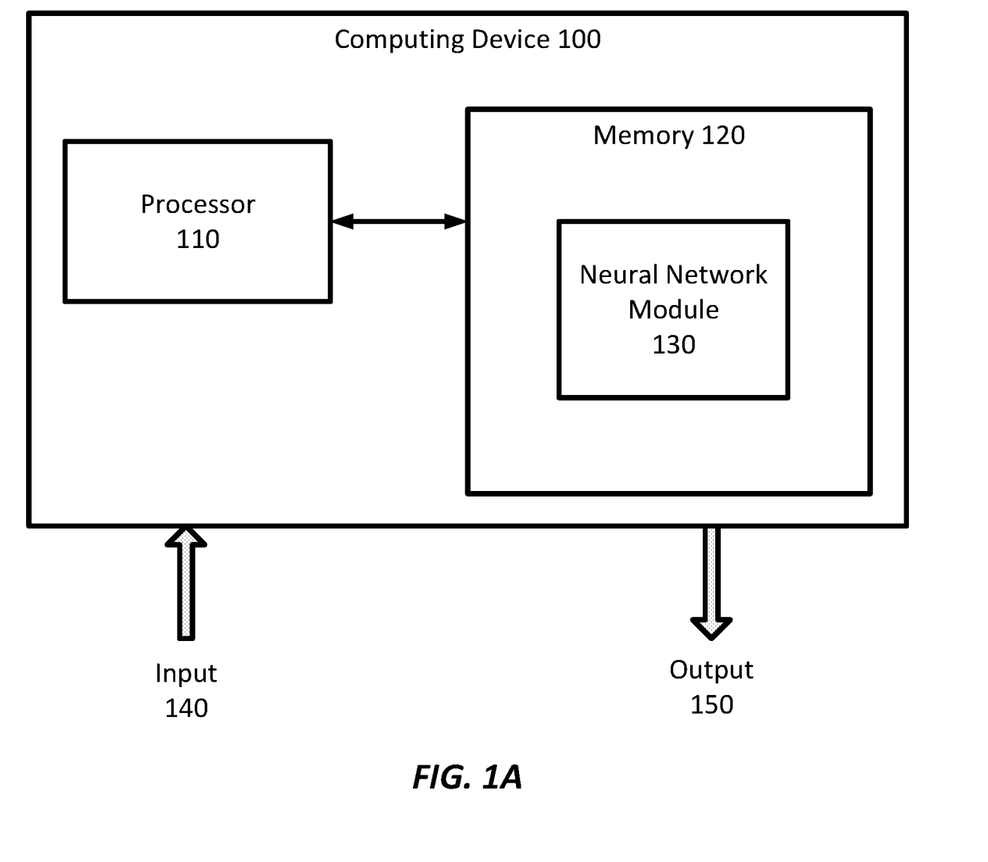
FIG. 1A is a simplified diagram of a computing device according to some embodiments.

FIG. 1A is a simplified diagram of a computing device 100 according to some embodiments. As shown in FIG. 1A, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

As shown, memory 120 includes a neural network module 130 that may be used to implement and/or emulate the neural network systems and models described further herein and/or to implement any of the methods described further herein. In some examples, neural network module 130 may be used to translate structured text. In some examples, neural network module 130 may also handle the iterative training and/or evaluation of a translation system or model used to translate the structured text. In some examples, memory 120 may include non-transitory, tangible, machine readable media that includes executable code that when run by one or more processors (e.g., processor 110) may cause the one or more processors to perform the counting methods described in further detail herein. In some examples, neural network module 130 may be implemented using hardware, software, and/or a combination of hardware and software. As shown, computing device 100 receives input 140, which is provided to neural network module 130, neural network module 130 then generates output 150.

Figure 1B:
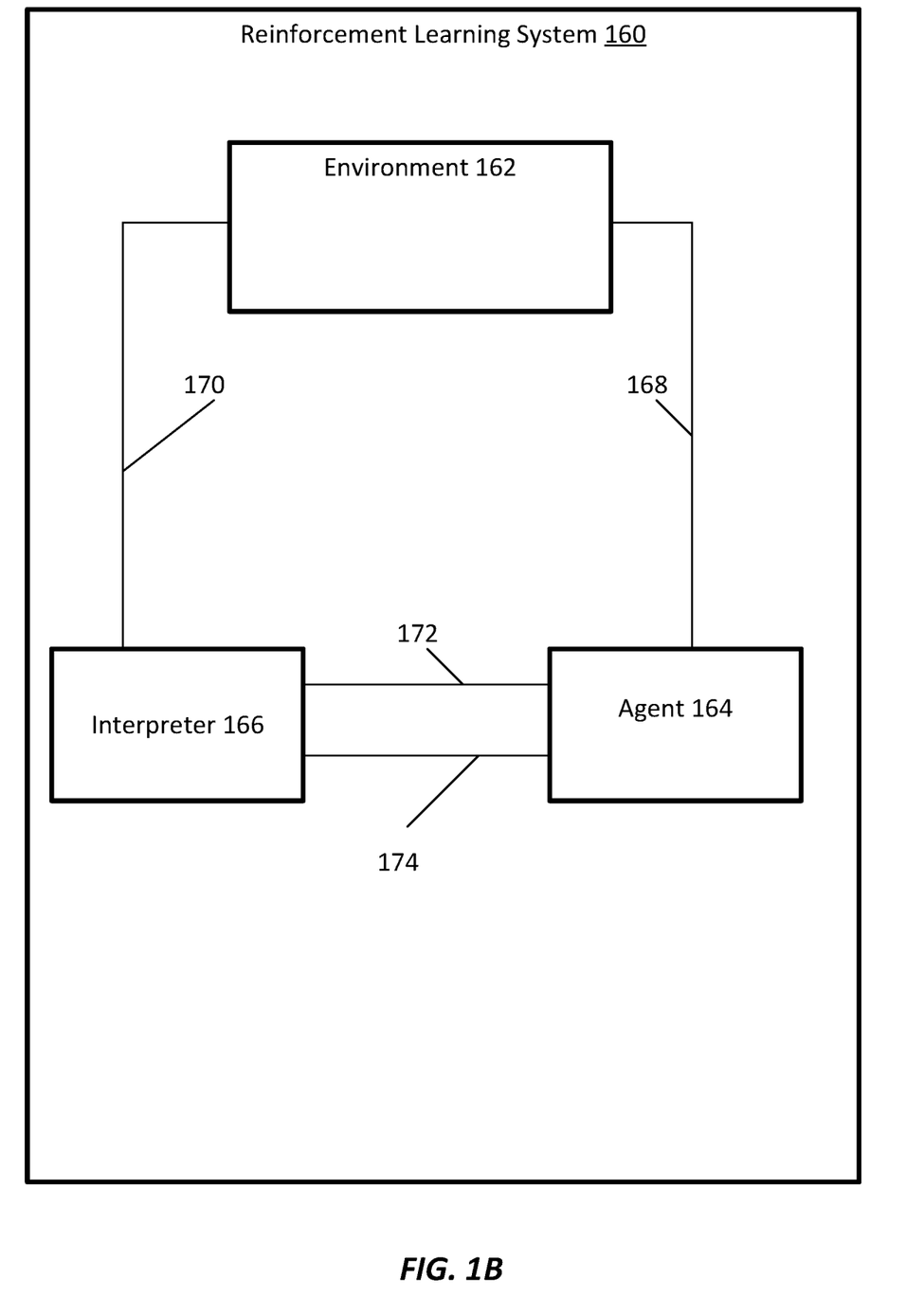
FIG. 1B is a simplified diagram of a reinforcement learning system according to some embodiments.

FIG. 1B illustrates an example of a reinforcement learning system 160 (e.g., neural network module 130 of FIG. 1A). Before describing exemplary embodiments, a general introduction and description of notations is provided. Reinforcement learning (RL) is a machine learning paradigm, where agents (e.g., implemented in software) takes actions in an environment so as to maximize some notion of cumulative reward. RL differs from supervised learning in that labelled input/output pairs need not be presented, and sub-optimal actions need not be explicitly corrected. Instead, in RL, the focus is finding a balance between exploration (of uncharted territory) and exploitation (of current knowledge). In RL, the environment is typically formulated as a Markov Decision Process (MDP). A Markov decision process (MDP) is a discrete time stochastic control process. It provides a mathematical framework for modeling decision making in situations where outcomes are partly random and partly under the control of a decision maker. Meta reinforcement learning (Meta-RL) is a type of RL that considers a distribution of different yet related tasks (e.g., with different reward function or different transition probabilities from one state to another). Those tasks share some similarities between them. In an example, the corresponding environments of those tasks have similarities (e.g., the same or similar transition dynamics equations) but have differences (e.g., with different configurations).

The reinforcement learning algorithms may utilize various dynamic programming techniques. Typically, the dynamic programming methods used in reinforcement learning algorithms do not assume knowledge of an exact mathematical model of the MDP. As illustrated in the example of FIG. 1B, in a reinforcement learning system 160, an agent 164 takes actions 168 in an environment 162. The corresponding observation 170 is interpreted by an interpreter 166 into a reward 172 and a representation of the state 174. The reward 172 and state 174 are fed back into the agent 164.

The environment 162 is typically formulated as a Markov Decision Process (MDP). A discrete-time Markov decision process (MDP) may be defined by (S, A, P, ρ0, r, γ), where S is a set of n-dimensional environment and agent states, A is a set of m-dimensional actions, $P: S \times A \times S \rightarrow [0, 1]$ is the state transition probability distribution, $\rho 0: S \rightarrow [0, 1]$ is the distribution over initial states, $\pi: S \times A \rightarrow R$ is the reward function, and $\gamma \in [0, 1]$ is the discount factor. A stochastic policy is denoted as $\pi: S \times A \rightarrow [0, 1]$, which aims to optimize the expected return $\eta(\pi) = E_\tau[\Sigma_{t=0}^\infty r(s_t, a_t)]$, where $\tau = (s_0, a_0, \ldots)$ is the trajectory following $s_0 \sim \rho_0$, $a_t \sim \pi(a_t|s_t)$, $s_{t+1} \sim P(s_{t+1}|s_t, a_t)$. A policy $\pi$ may be parameterized by parameters $\theta$, and such a policy is denoted as $\pi_\theta$. A reinforcement learning agent 164 interacts with its environment 162 in discrete time steps. At each time t, the agent 164 receives an observation, which typically. includes the reward 172 and state 174. It then chooses an action at from the set of available actions, which is subsequently sent to the environment 162. The environment 162 moves to a new state $s_{t+1}$ and the reward $r_{t+1}$ associated with the transition $(s_t, a_t, s_{t+1})$ is determined. The goal of a reinforcement learning agent 164 is to collect as much reward as possible. A value function may be defined as follows:

$$V_\pi(s_t) = E_{a_t, s_{t+1}, a_{t+1}, \ldots} [\Sigma_{i=0}^\infty \gamma^i r(s_{t+i}, a_{t+i})]. \quad (1)$$

The state-action value function (also referred to as Q function) may be defined as follows:

$$Q_\pi(s_t, a_t) = E_{s_{t+1}, a_{t+1}, \ldots} [\Sigma_{i=0}^\infty \gamma^i r(s_{t+i}, a_{t+i})] \quad (2)$$

Reinforcement learning considers the problem of finding an optimal policy $\pi_\theta$ for an agent which interacts with an environment and collects reward per action. In some embodiments, reinforcement learning algorithms may utilize dynamic programming techniques including policy gradient methods. Policy gradient methods estimate the gradient of expected returns with respect to the policy parameters $\theta$. In some embodiments, to train a policy ITO parameterized by parameters $\theta$, the policy gradient of a policy gradient method is provided as follows:

$$\nabla_\theta \eta(\pi_\theta) = \mathbb{E}_{\substack{s \sim \rho_\pi \\ a \sim \pi_\theta}} [\nabla_\theta \log \pi_\theta(a|s) Q_{\pi_\theta}(s, a)], \quad (3)$$

where $\rho_\pi(s) = \Sigma_{i=0}^\infty [\gamma^i Pr(s_t = s)]$ denotes the discounted state visitation frequency.

Estimating the policy gradient using Monte Carlo estimation for the Q function usually suffers from high variance on the policy gradient estimation, which may lead to poor sample efficiency during training. The control variates method may be used for variance reduction in policy gradient using Monte Carlo estimation. To reduce variance, control variates may be used, which may be subtracted from the Q-function estimate without introducing bias. In some examples, the control variates may include an appropriately chosen baseline $b(s_t)$ (also referred to as the control variate) (e.g., an optimal baseline, an action-dependent baseline). With control variates including a baseline $b(s_t)$, the policy gradient estimation of equation (3) is provided as follows:

$$\nabla_\theta \eta(\pi_\theta) = \mathbb{E}_{\substack{s \sim \rho_\pi \\ a \sim \pi_\theta}} [\nabla_\theta \log \pi_\theta(a|s)(Q_{\pi_\theta}(s, a) - b(s))] \quad (4)$$

In some examples, the baseline function $b(s_t)$ may include a value function (e.g., value function (1) providing $V_\pi(s_t)$ parameterized with parameters $\theta_V$) With control variates including a value function $V_\pi(s_t)$, the policy gradient estimation of equation (3) is provided as follows:

$$\nabla_\theta \eta(\pi_\theta) = \mathbb{E}_{\substack{s \sim \rho_\pi \\ a \sim \pi_\theta}} [\nabla_\theta \log \pi_\theta(a|s)(Q_{\pi_\theta}(s, a) - V_\pi(s))]. \quad (5)$$

Deep reinforcement learning (RL) typically requires an enormous number of samples to learn a single task, and typically does not allow generalization to new tasks, even similar ones. In Meta-RL, a distribution of tasks ρ(T) is used to learn a policy, such that the policy may be rapidly adapted to optimize performance on a specific task T from the distribution ρ(T), where each task corresponds to a distinct MDP. Those tasks in the distribution may be different but related. In an example, the tasks share a state and action space, but differ with regard to transition dynamics and/or reward function. In some embodiments, the policy gradient method in the Meta-RL learns the parameters $\theta$ of a policy $\pi_\theta$, such that the parameters can be optimized for a specific task T in the distribution of tasks ρ(T) with only one or several vanilla policy gradient (VPG) updates. In an example, the policy gradient method aims to maximize the following objective:

$$J(\theta) = \mathbb{E}_{T \sim p(T)} [\mathbb{E}_{\tau' \sim P_T(\tau'|\theta')} [R(\tau')]] \text{ with} \quad (6)$$

$$\theta' := U(\theta, T) = \theta + \alpha \nabla_\theta \mathbb{E}_{\tau \sim P_T(\tau|\theta)} [R(\tau)],$$

where T denotes the task and U denotes the task-dependent update function and is equivalent to performing one VPG step towards maximizing the performance of the policy on the task T. It is noted that while equation (6) includes a single update step version, it may be extended to handle multiple update steps.

Obtaining unbiased and low variance estimates of gradients in Meta-RL is challenging due to the difficulty of estimating the Hessian in computing gradient of the reinforcement learning objective (e.g., the objective function (6)). Due to the Hessian involved in the gradient estimation, even when meta-gradients are implemented to obtain an unbiased estimation, they may exhibit high variance. Such difficulty in estimating a large Hessian leads to high variance in gradient estimation, which leads to poor sample efficiency and unstable training in Meta-RL. In some embodiments, the problem of providing an estimator for the Hessian of the RL-objective (e.g., RL objective (6)) may be provided as an estimator for:

$$\nabla_\theta^2 J_{inner} = \nabla_\theta^2 \mathbb{E}_{\tau \sim P_\mathcal{T}(\tau|\theta)}[R(\tau)] \quad (7)$$

To address these challenges, as described in detail below with reference to FIGS. 2-5B, a method for incorporating control variates into gradient estimation via automatic differentiation is described, which improves the quality of gradient estimation by reducing variance without introducing bias. Furthermore, a method for extending the meta-learning framework to learning the control variates themselves is described, which enables efficient learning of the control variates from a distribution of MDPs of different tasks. Such improved gradient estimation (e.g., with reduced variance without introducing bias), higher performance across a variety of challenging Meta-RL environments is achieved.

FIGS. 2, 3, 4A, 4B, 5A, and 5B below illustrate various embodiments of training a neural network model by incorporating control variates into gradient estimation via automatic differentiation in Meta-RL.

Figure 2:
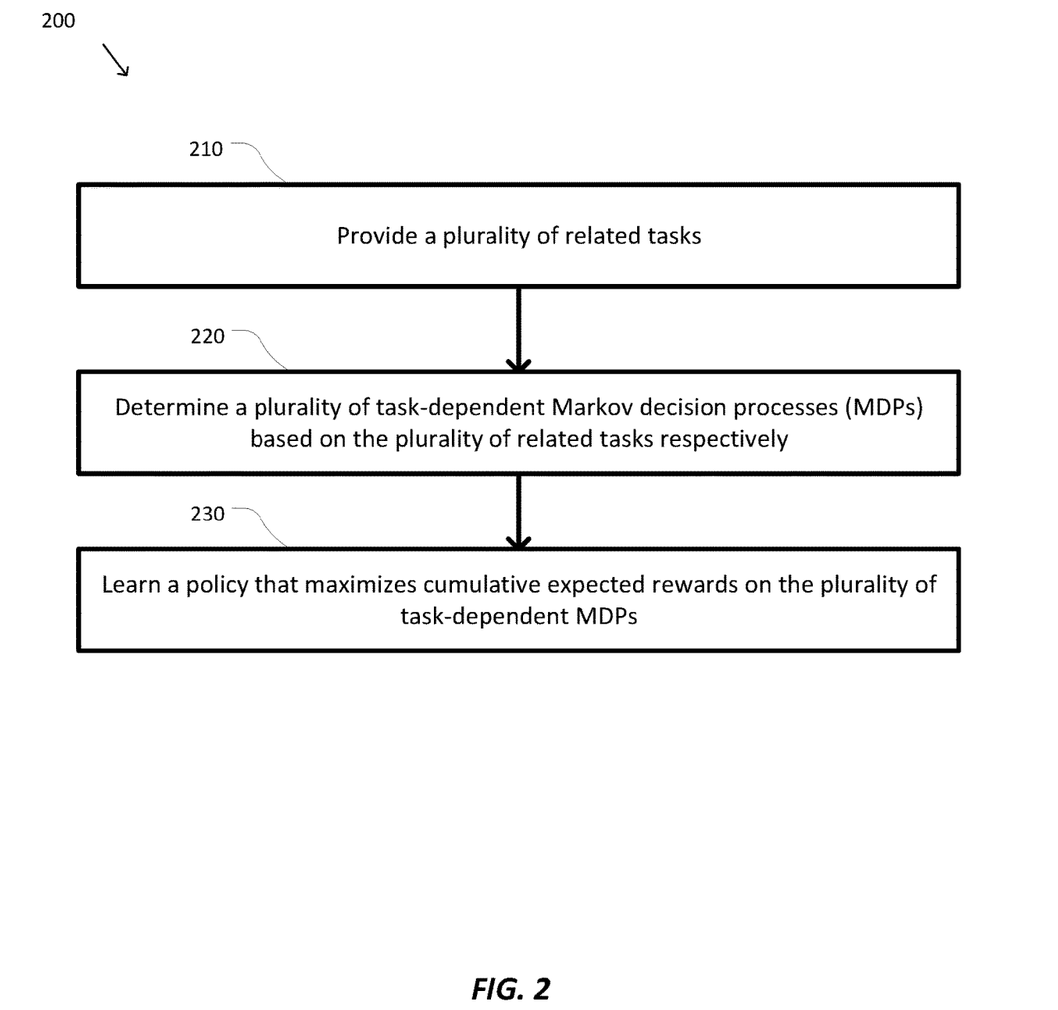
FIG. 2 is a simplified diagram of a method of training a neural network model according to some embodiments.

FIG. 2 is a simplified diagram of a method 200 of training a neural network model with Meta-RL according to some embodiments. One or more of the processes 210-230 of method 200 may be implemented, at least in part, in the form of executable code stored on non-transitory, tangible, machine-readable media that when run by one or more processors may cause the one or more processors to perform one or more of the processes 210-230. In some embodiments, method 200 may correspond to the method used by neural network module 130 to perform various tasks (e.g., image recognition, natural language processing, game playing, etc.).

At a process 210, a plurality of related tasks are received. Those tasks may be related but different. For example, the tasks may have different reward functions, or have different probabilities of transitions from one state to another.

At a process 220, a plurality of task-dependent Markov decision processes (MDPs) are determined based on the plurality of related tasks respectively. A task-dependent MDP may include a task description $z_i$ for a corresponding task $T_i$ compared to a standard MDP. In a task-dependent MDP, a next state $s_{t+1}$ may depend on the previous state, the action, and the specific task. In other words, the next state $s_{t+1}$ may depend on ($s_t$, $a_t$, $T_i$).

At a process 230, a policy that that maximizes cumulative expected rewards on the plurality of task-dependent MDPs is learned. In some examples, a policy gradient method for learning a policy for a group of task-dependent MDPs are used.

Figure 3:
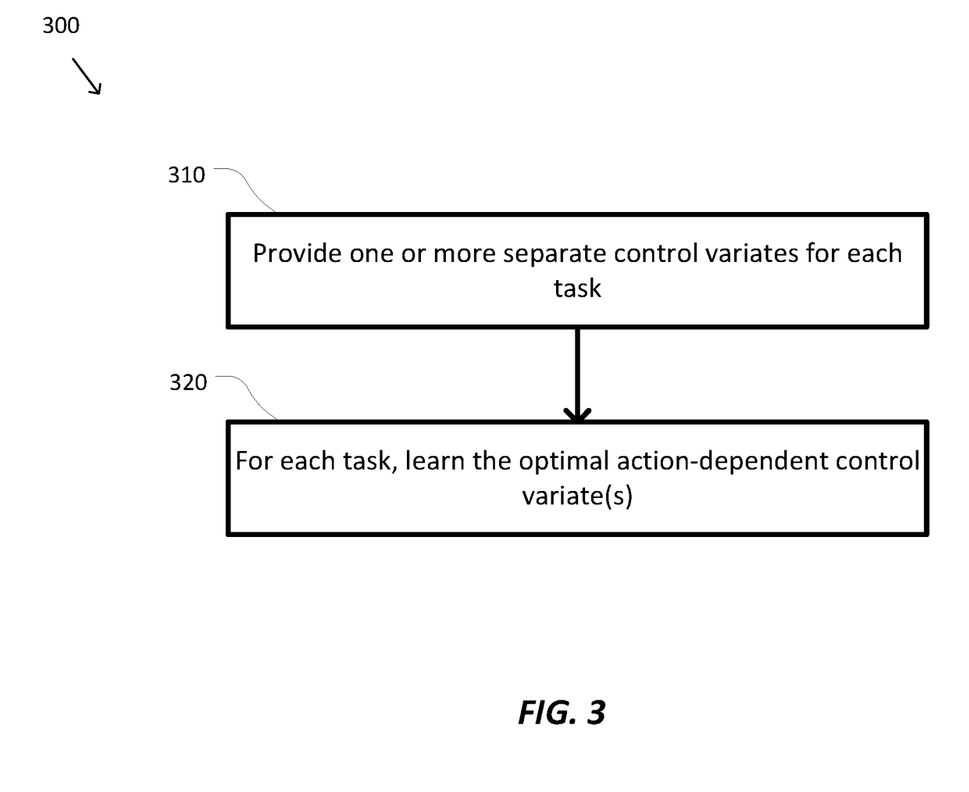
FIG. 3 is a simplified diagram of a method of learning control variates for a neural network model according to some embodiments.
Figure 4A:
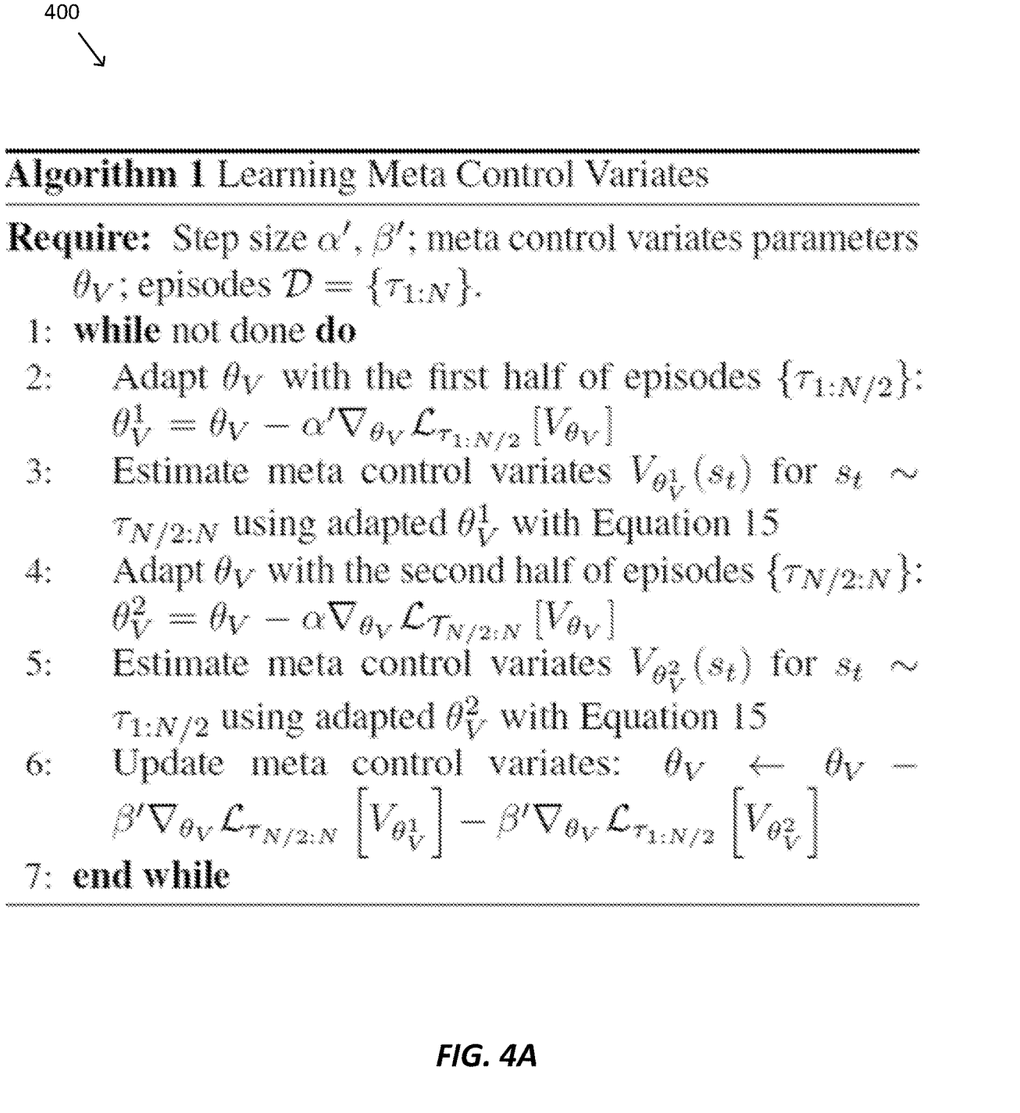
FIG. 4A illustrates pseudocode of an algorithm of learning meta control variates for a neural network model according to some embodiments.
Figure 4B:
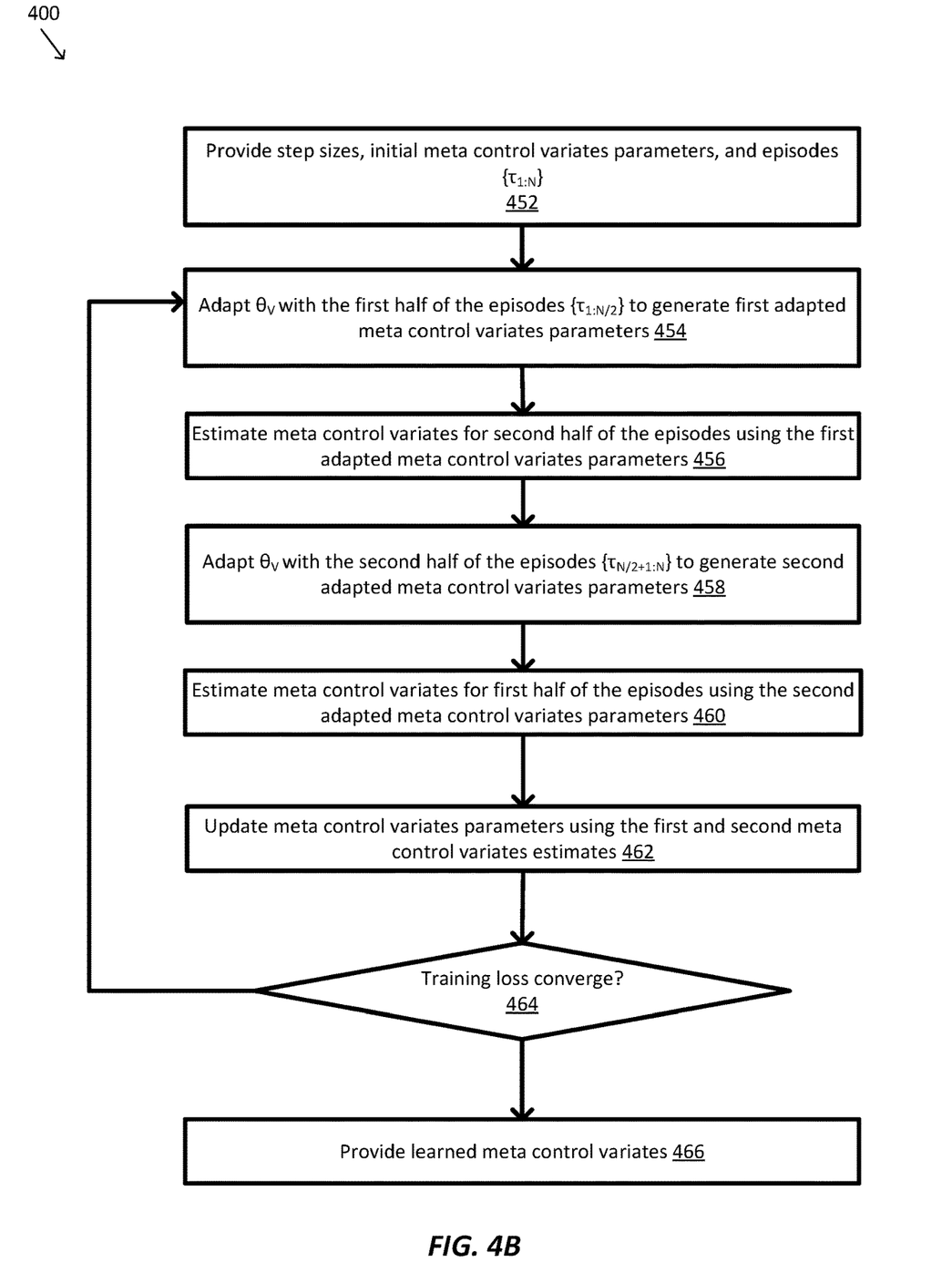
FIG. 4B is a simplified diagram of a method of learning control variates for a neural network model according to some embodiments.
Figure 5A:
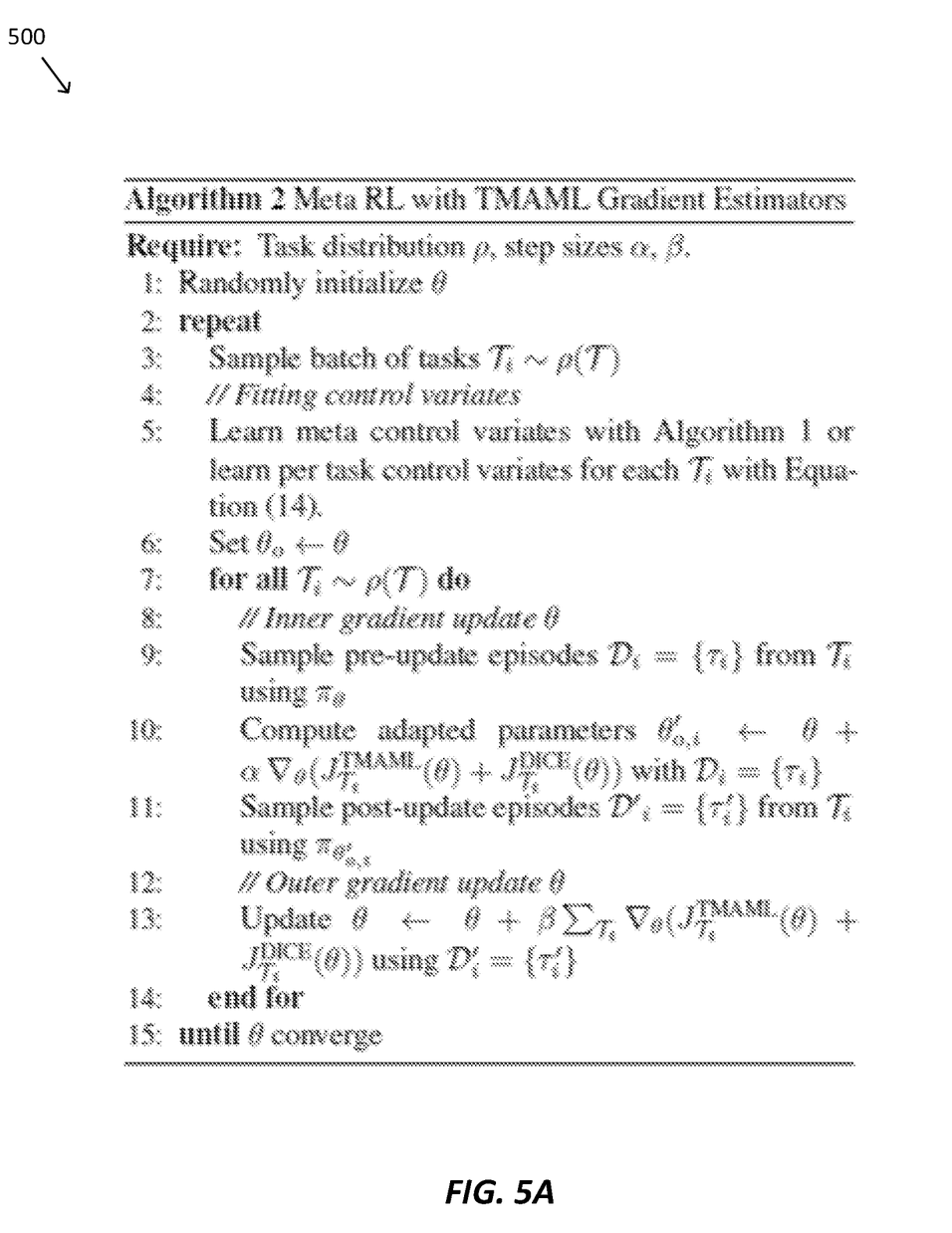
FIG. 5A illustrates pseudocode of an algorithm of training a neural network model using control variates and gradient estimators according to some embodiments.
Figure 5B:
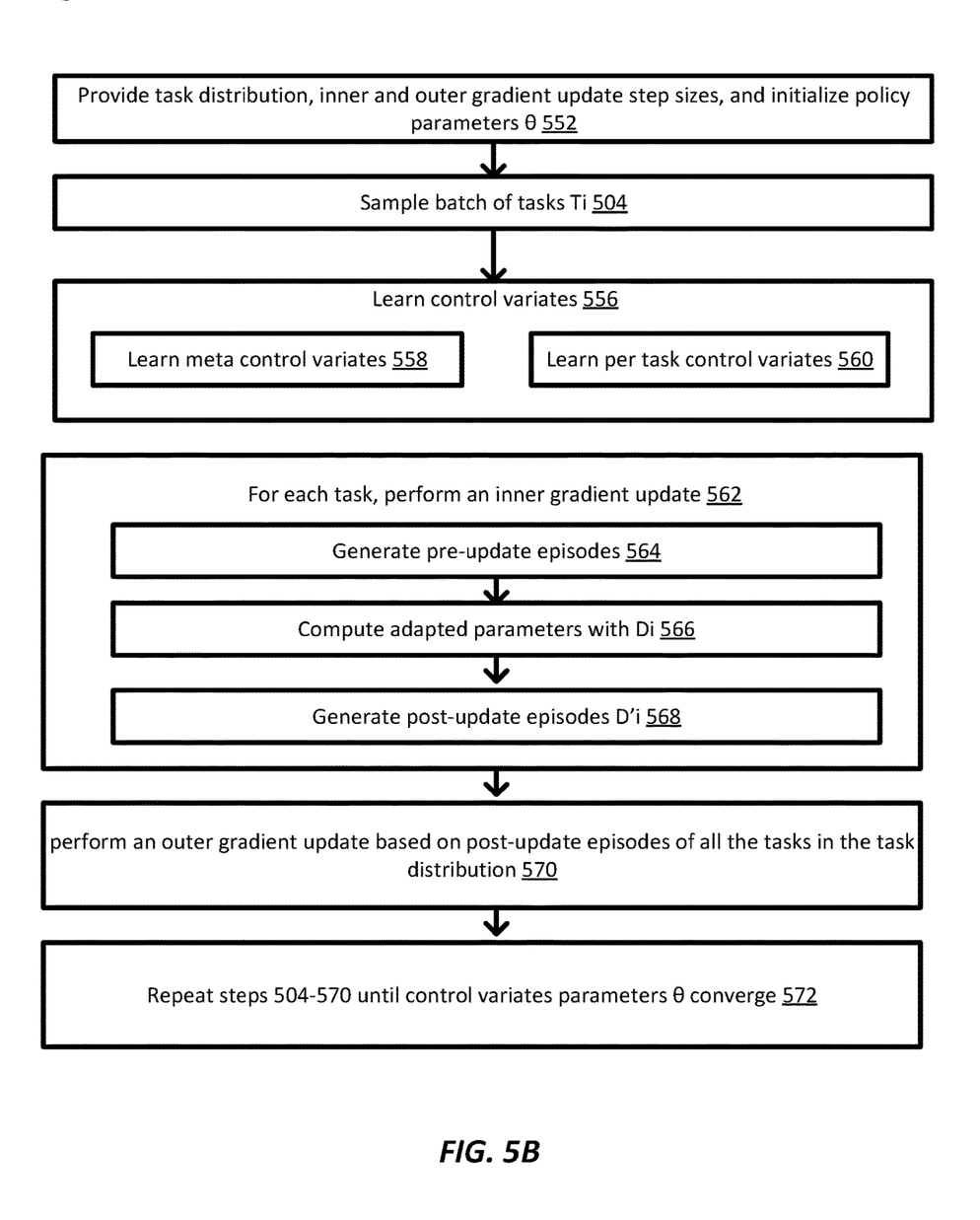
FIG. 5B is a simplified diagram of a method of training a neural network model using control variates and gradient estimators according to some embodiments.

To obtain unbiased and low variance policy gradient estimates, at process 230, control variates may be incorporated into gradient estimation for the policy. Referring to FIGS. 3, 4A, 4B, 5A, and 5B, methods for training a neural network model by incorporating control variates (e.g., per-task control variates, meta control variates) into gradient estimates for the policy of Meta-RL are described. FIGS. 3, 4A, and 4B illustrated different exemplary methods to learn different control variates. FIG. 3 is a simplified diagram of a method 300 of learning per-task control variates. FIGS. 4A and 4B illustrates a method 400 of learning meta control variates across different tasks. FIGS. 5A and 5B illustrate a method of training a neural network model for Meta-RL by incorporating control variates (e.g., per-task control variate, meta control variates, etc.) with gradient estimates.

Referring to the example of FIG. 3, a method 300 of learning per-task control variates is illustrated. The method 300 begins at block 302, where one or more separate control variates for each task of a plurality of tasks are provided. In other words, different tasks are provided with different control variates. The method 300 may proceeds to block 304, where for each task of the plurality of tasks, a training/learning process for those control variates in a neural network model is performed to generate the optimal control variate(s) (e.g., action-dependent optimal control variate(s)) for the corresponding task. In an example, the control variate $b(s_t, a_t, T_i)$ for each task $T_i$ of the task distribution including $T_1$ through $T_Z$ is learned as follows:

$$b(s_t, a_t, \mathcal{T}_i) = \mathbb{E}_{a_t^i}\left[\nabla_\theta \log \pi_\theta(a_t^i \mid s_i, \mathcal{T}_i)^\top \nabla_\theta \log \pi_\theta(a_t^i \mid s_t, \mathcal{T}_i)\hat{Q}(s_t, z, a_t)\right] / \quad (8)$$
$$\mathbb{E}_{a_t^i}[\nabla_\theta \log \pi_\theta(a_t^i \mid s_t, \mathcal{T}_i)^\top \nabla \log \pi_\theta(a_t^i \mid s_t, \mathcal{T}_i)].$$

By using the method 300, for each $T_i$ of the task distribution including $T_1$ through $T_Z$, a per-task optimal action-dependent control variate is learned. Two issues may arise from using such per-task optimal control variates: First, it does not scale well if the task distribution includes a large number Z of tasks $T_i$. Second, it does not exploit the similarity between different yet related environments for respective tasks. Referring to FIGS. 4A and 4B, to address these issues with per-task optimal control variates, a method 400 for learning meta control variates are provided to maximize the use of information across tasks of the task distribution including $T_1$ through $T_Z$.

As shown in the examples of FIGS. 4A and 4B, an example method 400 is illustrated for learning meta control variates parameters $\theta_V$ for value function $V_\pi(s_t)$. FIG. 4A illustrates an example pseudo code for implementing an algorithm for the method 400. FIG. 4B illustrates an example flow diagram of the method 400. The method 400 enables shared learning across different tasks, which is based on meta learning to maximize the use of information across tasks. A meta baseline function (or meta control variates parameters $\theta_V$ for value function $V_\pi(s_t)$) is leaned by using all the tasks including $T_1$ through $T_Z$ in the task distribution.

The method 400 begins at block 452 to provide initial values for optimization step sizes, meta control variates parameters $\theta_V$, and training episodes $D = \{\tau_{1:N}\}$. The training episodes D includes N episodes (also referred to as trajectory), where N is an integer, and $\tau_i$ is a episode (trajectory) for the $i^{th}$ task.

The method 400 proceeds to block 454, where meta control variates parameters $\theta_V$ are trained with a first portion $D_1$ of the episodes D, including e.g., M episodes, where M is less than N. In an example, the first portion $D_1$ includes the first half of the episodes D, where M=N/2 and $D_1 = \{\tau_{1:N/2}\}$. The resulting adapted meta control variates parameters (trained by episodes $D_1$) are denoted as $\theta_V^1$, which may be generated for example, as follows:

$$\theta_V^1 = \theta_V - \alpha' \nabla_{\theta_V} \mathcal{L}_{\tau_{1:N/2}}[V_{\theta_V}], \quad (9)$$

wherein an example of the loss function $\mathcal{L}_T$ in the value function $V_{\theta_V}$ is as follows: (=10)

$$\mathcal{L}_\tau[V_{\theta_V}] = \sum_{T_i} \sum_{s_i, r_t \sim |\tau_\gamma} \left\| V_{\theta_V}(s_i) - \sum_{t'=t}^{T} \gamma^{t'-t} r_t(s_t, a_t, T_i) \right\|^2. \quad (10)$$

The method 400 may proceed to block 456, where meta control variates $V_{\theta_V^1}(s_t)$ for $s_t \sim D_2$ are estimated using the trained meta control variates parameters $\theta_V^1$ (e.g., trained using $D_1$). $D_2$ is a portion of the episodes D that is different from $D_1$. In an example, portion $D_2$ of the episodes D includes the $(M+1)^{th}$ to $N^{th}$ episodes in D, denoted as $D_2=\{\tau_{M+1:N}\}$, where M may be a positive integer between 1 and N, e.g., N/2. In particular example where M=N/2, $D_1$ (e.g., $D1=\{\tau_{1:N/2}\}$) and $D_2$ (e.g., $$D2 = \left\{\tau_{\frac{N}{2}+1:N}\right\})$$

have the same number of episodes, and do not include any overlapping episode. In alternative embodiments, $D_1$ and $D_2$ may include different numbers of episodes, and/or include one or more overlapping episodes.

The method 400 may proceed to block 458, where meta control variates parameters $\theta_V$ are trained with the portion $D_2$ of the episodes D. The resulting adapted meta control variates parameters (trained by episodes $D_2$) are denoted as $\theta_V^2$. In an example, it may be generated as follows:

$$\theta_V^2 = \theta_V - \alpha' \nabla_{\theta_V} \mathcal{L}_{T_{\frac{N}{2}+1:N}}[V_{\theta_V}]. \quad (11)$$

The method 400 may proceed to block 460, where meta control variates $V_{\theta_V^2}(s_t)$ for $s_t \sim D_1$ are estimated using the trained meta control variates parameters $\theta_V^2$ trained using $D_2$.

The method 400 may proceed to block 462, where the meta control variates parameters $\theta_V$ is updated using step size $\beta'$ and meta control variates estimates $V_{\theta_V^1}(s_t)$ and $V_{\theta_V^2}(s_t)$, as follows:

$$\theta_V = \theta_V - \beta' \nabla_{\theta_V} \mathcal{L}_{T_{M+1:N}}[V_{\theta_V^1}] - \beta' \nabla_{\theta_V} \mathcal{L}_{T_{1:M}}[V_{\theta_V^2}]. \quad (12)$$

The method 400 may proceed to block 464, where it is determined whether the training loss L has converged. If at block 464 it is determined that the training loss L has not converged, the method 400 proceeds to block 454 to continue the training of the meta control variates parameters. If at block 464 it is determined that the training loss L has converged, the method 400 proceeds to block 466 to provide the learned meta control variates parameters $\theta_V$ and the associated learned metal control variates $V_{\theta_V}$ with the learned meta control variates parameters $\theta_V$.

Referring to FIGS. 5A and 5B, a method 500 for training a neural network by incorporating learned control variates (e.g., learned meta control variates $V_{\theta_V}$ with learned meta control variates parameters $\theta_V$ obtained using method 400 of FIGS. 4A and 4B, learned per-task control variates, any other suitable learned control variates, and/or a combination thereof) with gradient estimators for gradient-based Meta-RL is illustrated. By using the method 500, policy parameters $\theta$ are optimized more quickly to adapt to new tasks.

The method 500 begins at block 552 where inner gradient update step size $\alpha$, outer gradient update step size $\beta$, and task distribution $\rho$ are provided. In some embodiment, the policy parameters $\theta$ are initialized (e.g., randomly). The method 500 proceeds to block 554, where batches are sampled for each task Ti in the task distribution (e.g., including tasks $T_1$ through $T_Z$ each with its own MDP).

The method 500 may proceed to block 556, where control variates are learned. In some embodiments, block 556 includes process 558, where meta control variates are learned (e.g., using a method 400 of FIGS. 4A and 4B). In some embodiments, block 556 includes process 560, where per-task control variates are learned (e.g., using a method 300 of FIG. 3).

The method 500 may proceed to block 562, where for each task Ti in the task distribution (e.g., including tasks $T_1$ through $T_Z$), an inner gradient update using an inner gradient update step size $\alpha$ is performed.

In some embodiments, for each task Ti of tasks $T_i$ through $T_Z$ of the task distribution, the process 562 includes blocks 562, 566, and 568. The process 562 may start with block 564, where pre-update episodes $D_i=\{\tau_i\}$ are sampled from task Ti using the stochastic policy $\pi_\theta$ parameterized by parameters $\theta$. The process 562 may proceed to block 566, where adapted parameters $\theta'_{o,i}$ is computed with a Meta-learning gradient estimator (e.g., a Taming Model Agnostic Meta Learning (TMAML) gradient estimator) with an inner gradient update step size $\alpha$ using the pre-update episodes Di, e.g., as follows:

$$\theta'_{a,i} = \theta + \alpha \nabla_\theta (J_{T_i}^{TMAML}(\theta) + J_{T_i}^{DICE}(\theta)), \quad (13)$$

where $J_{T_i}^{TMAML}$ is a surrogate function that introduces a control variate into gradient estimation, which helps to obtain unbiased and low variance gradient estimates. An example of $J_{T_i}^{TMAML}$ is provided as follows:

$$J_{T_i}^{TMAML} = \sum_{t=0}^{H-1}\left[1 - \left(\prod_{t'=0}^{t} \frac{\pi_\theta(a_{t'}\,|\,s_{t'})}{\perp(\pi_\theta(a_{t'}\,|\,s_{t'}))}\right)\right]\left(1 - \frac{\pi_\theta(a_t\,|\,s_t, z)}{\perp(\pi_\theta(a_t\,|\,s_t, z))}\right)b, \quad (14)$$

where b is a baseline function serving as the control variates, and $\perp$ denotes the "stop gradient" operation. In some embodiments, b depends on state $s_t$ and task $T_i$, is provided as $b(s_t, T_i)$.

The surrogate function (14) may be used (e.g., to be combined with other gradient estimates, e.g., an Infinitely Differentiable Monte-Carlo Estimator (DICE) $J_{T_i}^{DICE}$ introduced by Foerster et. al) to obtain unbiased and reduced variance gradient estimates. With a proper control variate b $(s_t, T_i)$ (e.g., correlates with estimate of interest), the surrogate function (14) satisfies:

$$\mathbb{E}_{\tau \sim P_{T_i}}(\tau\,|\,\theta)[\nabla_\theta^2 J_{T_i}^{TMAML}] = 0. \quad (15)$$

As such, the surrogate function $J_{T_i}^{TMAML}$ may be used to provide gradient estimates without introducing any bias.

Furthermore, $J_{T_i}^{TMAML}$ may be used to incorporate control variates into gradient estimation via automatic differentiation frameworks (e.g., by auto-differentiating twice), which reduces gradient variance (e.g., reducing the variance of estimating the Hessian) without introducing any bias into gradient estimation. For example, taking the Hessian of $J_{T_i}^{TMAML}$ combined with $J_{T_i}^{DICE}$ provides:

$$\nabla_\theta^2 (J_{\mathcal{T}_i}^{DICE} + J_{\mathcal{T}_i}^{TMAML}) \to \sum_{t=0}^{H-1} \left[ \nabla_\theta^2 \log \pi_\theta(a_t \mid s_t, z) \left( \sum_{t'=0}^{t} r(a_{t'}, s_{t'}, z) \right) \right] + \quad (16)$$

$$2 \sum_{t=0}^{H-1} \left[ \nabla \log \pi_\theta(a_t \mid s_t, z)^T \left( \sum_{t'=t}^{H-1} \nabla \log \pi_\theta(a_{t'} \mid s_{t'}, z) \left( \sum_{k=t'}^{H-1} r(a_k, s_k) - b(s_i, \mathcal{T}_i) \right) \right) \right],$$

where $\to$ denotes evaluate value. The baseline function b is referred to as a good/proper baseline function when the baseline function b correlates with estimate of interest (e.g., a baseline function for generating a population number correlates with house rice estimation). As shown in formula (16), when $b(s_t, T_i)$ is a good baseline function that correlates with $$\sum_{k=t'}^{H-1} r(a_k, s_k),$$

the product in formula (16)

$$\left( \sum_{t'=t}^{H-1} \nabla \log \pi_\theta(a_{t'} \mid s_{t'}, z) \left( \sum_{k=t'}^{H-1} r(a_k, s_k) - b(s_i, \mathcal{T}_i) \right) \right)$$

has a lower variance than the same without $b(s_t, T_i)$, and as such, leading to a lower variance estimate of $\nabla_\theta^2$ ($J_{Ti}^{DICE}$+ $J_{Ti}^{TMAML}$) compared to $\nabla_\theta^2$ ($J_{Ti}^{DICE}$). It is noted that while $J_{Ti}^{DICE}$ is used as an example of the gradient estimation function, any other suitable gradient estimation may be used together with $J_{TA}$ML. Accordingly, the surrogate function (14) may be used to obtain unbiased and reduced variance gradient estimates by incorporating the control variates via automatic differentiation frameworks (e.g., by auto-differentiating twice).

The process 562 may proceed to block 568, where post-update episodes $D'_i=\{\tau'_i\}$ are sampled from task Ti using the policy $\pi_{\theta'_{o,i}}$ parameterized by adapted parameters $\theta'_{o,i}$.

After performing an inner gradient update for each task Ti of tasks $T_i$ through $T_Z$ at block 562, the method 500 may proceed to block 574, where an outer gradient update is performed based on post-update episodes of all the tasks in the task distribution is performed. In an example, parameters θ may be updated using post-update episodes $D'_i=\{\tau'_i\}$ using an outer gradient update step size β as follows:

$$\theta = \theta + \beta \sum_{\mathcal{T}_i} \nabla_\theta (J_{\mathcal{T}_i}^{TMAML}(\theta) + J_{\mathcal{T}_i}^{DICE}(\theta)). \quad (17)$$

In various embodiments, the inner gradient update step size α and outer gradient update step size β may be configured based on the tasks.

The method 500 may proceed to block 572, where steps 504 through 570 are repeated until the policy parameters θ converge. By incorporating the control variates in both inner and outer gradient updates by using the surrogate function $J_{Ti}^{TMAML}$ via automatic differentiation frameworks, the Meta-RL training is improved. Furthermore, TMAML with incorporated control variates (e.g., meta control variates) may be used in multi-agent reinforcement learning, where higher order gradients are common and are often high variance, which impedes learning. Furthermore, TMAML with incorporated control variates (e.g., meta control variates) may be used to learn from partially observable MDPs.

The method 500 may be used in various Meta-RL environments. In a language translation environment, the tasks may include translation tasks between different languages (e.g., an English to Japanese task, a Spanish to English task, a Germany to Chinese task, etc.). In an ant reaching target coordinates environment including a plurality of tasks, each task is associated with a location randomly chosen from a circle in the XY plane that the agent must reach. The goal location is not given to the agent. Instead, the agent must learn to locate, approach, and stop at the target. The agent receives at each time step a reward composed of a control cost, a contact cost, a survival reward, and a penalty equal to its Li distance to the target position. The tasks are generated by sampling the target positions from the uniform distribution (e.g., on $[-3, 3]^2$). In an Ant, Humanoid, Walker, HalfCheetah moving forward or backward environment including a plurality of tasks, each task is chosen between two directions: forward and backward. The agent must run along the goal direction as far as possible and receives at each time step a reward composed of a control cost and a reward equal to its velocity in the target direction. The tasks are generated by sampling the target directions from a Bernoulli distribution on $\{-1, 1\}$. In an Ant and Humanoid reaching random direction in XY plane environment with a plurality of tasks, each task corresponds to a random direction in the XY plane. The agent receives a reward composed of a control cost and a penalty equal to the difference between its current direction and the target direction. In a Walker, Swimmer, and HalfCheetah reaching random velocity environment with a plurality of tasks, each task corresponds to a random velocity, and the agent receives at each time step a reward composed of a control cost and a penalty equal to the difference between its current velocity and the target velocity. The tasks are generated by sampling the target velocities from the uniform distribution on [0, 2].

Some examples of computing devices, such as computing device 100 may include non-transitory, tangible, machine readable media that include executable code that when run by one or more processors (e.g., processor 110) may cause the one or more processors to perform the processes of methods 200, 300, 400, and 500. Some common forms of machine readable media that may include the processes of methods 200, 300, 400, and 500 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure.

Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for training a reinforcement learning neural network model, comprising:
    receiving a distribution including a plurality of related tasks; and
    training parameters for a reinforcement learning neural network model based on a gradient estimation associated with the parameters using samples associated with the plurality of related tasks,
        wherein control variates are incorporated into the gradient estimation using a combination of a first gradient estimator and a second gradient estimator,
        wherein the first gradient estimator uses the control variates and the second gradient estimator does not use the control variates,
        wherein the control variates are represented by a baseline function depending on the tasks and corresponding states of the tasks,
        wherein the gradient estimation is generated using Hessian estimation, and
        wherein a product of two factors for the Hessian estimation based on the first gradient estimator and the second gradient estimator is reduced by subtracting the baseline function from one of the two factors.

2. The method of claim 1,
    wherein the control variates are incorporated into the gradient estimation by automatic differentiation to reduce variance without introducing bias into the gradient estimation.

3. The method of claim 2, wherein the automatic differentiation includes twice auto-differentiating for Hessian estimation for gradient estimation.

4. The method of claim 1, wherein the method further comprises:
    training the control variates to generate trained control variates; and
    incorporating the trained control variates into the gradient estimation.

5. The method of claim 4, wherein the training the control variates includes:
    for each task of the plurality of related tasks, training a separate control variate.

6. The method of claim 5, wherein the training the control variates includes:
    training the control variates across the plurality of related tasks.

7. The method of claim 6, wherein the training the control variates across the plurality of related tasks includes:
    receiving a plurality of episodes corresponding to the plurality of related tasks;
    adapting meta control variates parameters for control variates using a first portion of the episodes associated with a first portion of the tasks to generate first adapted meta control variates parameters;
    generating first meta control variates estimates associated with a second portion of the tasks based on the first adapted meta control variates parameters;
    adapting the meta control variates parameters using a second portion of the episodes associated with the second portion of the tasks to generate second adapted meta control variates parameters;
    generating second meta control variates estimates associated with the first portion of the tasks based on the second adapted meta control variates parameters; and
    updating the meta control variates parameters using the first and second meta control variates estimates.

8. A non-transitory machine-readable medium comprising executable code which when executed by one or more processors associated with a computing device are adapted to cause the one or more processors to perform a method comprising:
    receiving a distribution including a plurality of related tasks; and
    training parameters for a reinforcement learning neural network model based on gradient estimation associated with the parameters using samples associated with the plurality of related tasks,
        wherein control variates are incorporated into the gradient estimation using a combination of a first gradient estimator and a second gradient estimator,
        wherein the first gradient estimator uses the control variates and the second gradient estimator does not use the control variates,
        wherein the control variates are represented by a baseline function depending on the tasks and corresponding states of the tasks,
        wherein the gradient estimation is generated using Hessian estimation, and
        wherein a product of two factors for the Hessian estimation based on the first gradient estimator and the second gradient estimator is reduced by subtracting the baseline function from one of the two factors.

9. The non-transitory machine-readable medium of claim 8,
    wherein the control variates are incorporated into the gradient estimation by automatic differentiation to reduce variance without introducing bias into the gradient estimation.

10. The non-transitory machine-readable medium of claim 9, wherein the automatic differentiation includes twice auto-differentiating for the Hessian estimation for gradient estimation.

11. The non-transitory machine-readable medium of claim 8, wherein the method further comprises:
    training the control variates to generate trained control variates; and
    incorporating the trained control variates into the gradient estimation.

12. The non-transitory machine-readable medium of claim 11, wherein the training the control variates includes:
for each task of the plurality of related tasks, training a separate control variate.

13. The non-transitory machine-readable medium of claim 11, wherein the training the control variates includes:
training the control variates across the plurality of related tasks.

14. The non-transitory machine-readable medium of claim 13, wherein the training the control variates across the plurality of related tasks includes:
receiving a plurality of episodes corresponding to the plurality of related tasks;
adapting meta control variates parameters for control variates using a first portion of the episodes associated with a first portion of the tasks to generate first adapted meta control variates parameters;
generating first meta control variates estimates associated with a second portion of the tasks based on the first adapted meta control variates parameters;
adapting the meta control variates parameters using a second portion of the episodes associated with the second portion of the tasks to generate second adapted meta control variates parameters;
generating second meta control variates estimates associated with the first portion of the tasks based on the second adapted meta control variates parameters; and
updating the meta control variates parameters using the first and second meta control variates estimates.

15. A computing device comprising:
a memory; and
one or more processors coupled to the memory;
wherein the one or more processors are configured to:
receive a distribution including a plurality of related tasks; and
train parameters for a reinforcement learning neural network model based on gradient estimation associated with the parameters using samples associated with the plurality of related tasks,
wherein control variates are incorporated into the gradient estimation using a combination of a first gradient estimator and a second gradient estimator,
wherein the first gradient estimator uses the control variates and the second gradient estimator does not use the control variates,
wherein the control variates are represented by a baseline function depending on the tasks and corresponding states of the tasks,
wherein the gradient estimation is generated using Hessian estimation, and
wherein a product of two factors for the Hessian estimation based on the first gradient estimator and the second gradient estimator is reduced by subtracting the baseline function from one of the two factors.

16. The computing device of claim 15,
wherein the control variates are incorporated into the gradient estimation by automatic differentiation to reduce variance without introducing bias into the gradient estimation.

17. The computing device of claim 16, wherein the automatic differentiation includes twice auto-differentiating for the Hessian estimation for the gradient estimation.

18. The computing device of claim 15, wherein the one or more processors are further configured to:
train the control variates to generate trained control variates; and
incorporate the trained control variates into the gradient estimation.

19. The computing device of claim 18, wherein the training the control variates includes:
for each task of the plurality of related tasks, training a separate control variate.

20. The computing device of claim 18, wherein the training the control variates includes:
training the control variates across the plurality of related tasks.

* * * * *